June 6, 1950     H. G. BUSIGNIES     2,510,066
VEHICLE COMMUNICATION SYSTEM
Filed Jan. 16, 1946     8 Sheets-Sheet 1
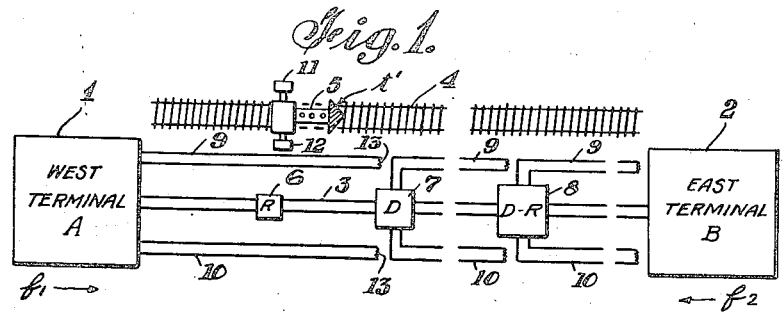
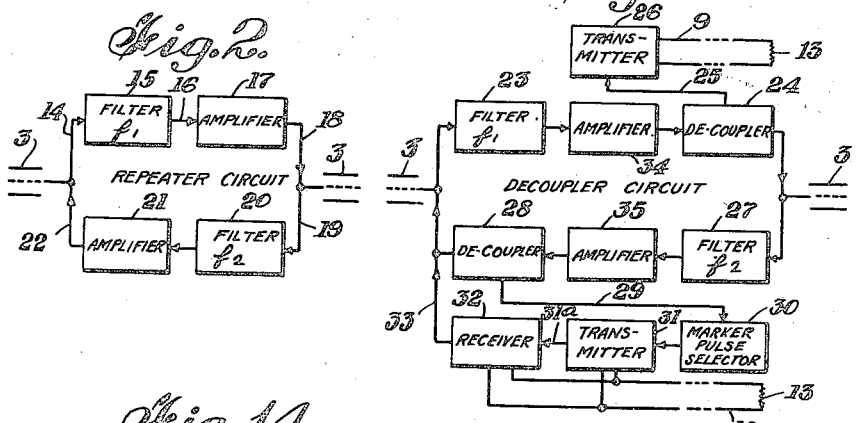
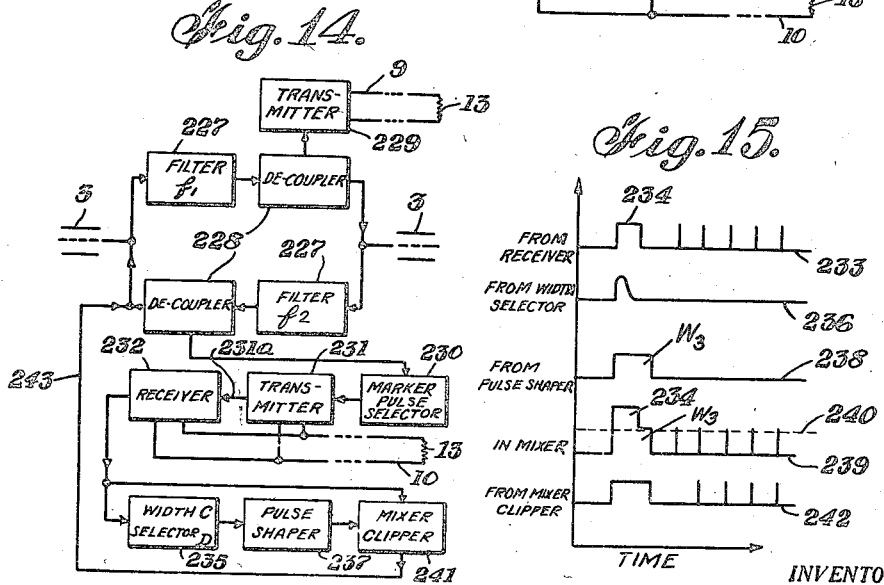
INVENTOR.
HENRI G. BUSIGNIES
BY
ATTORNEY

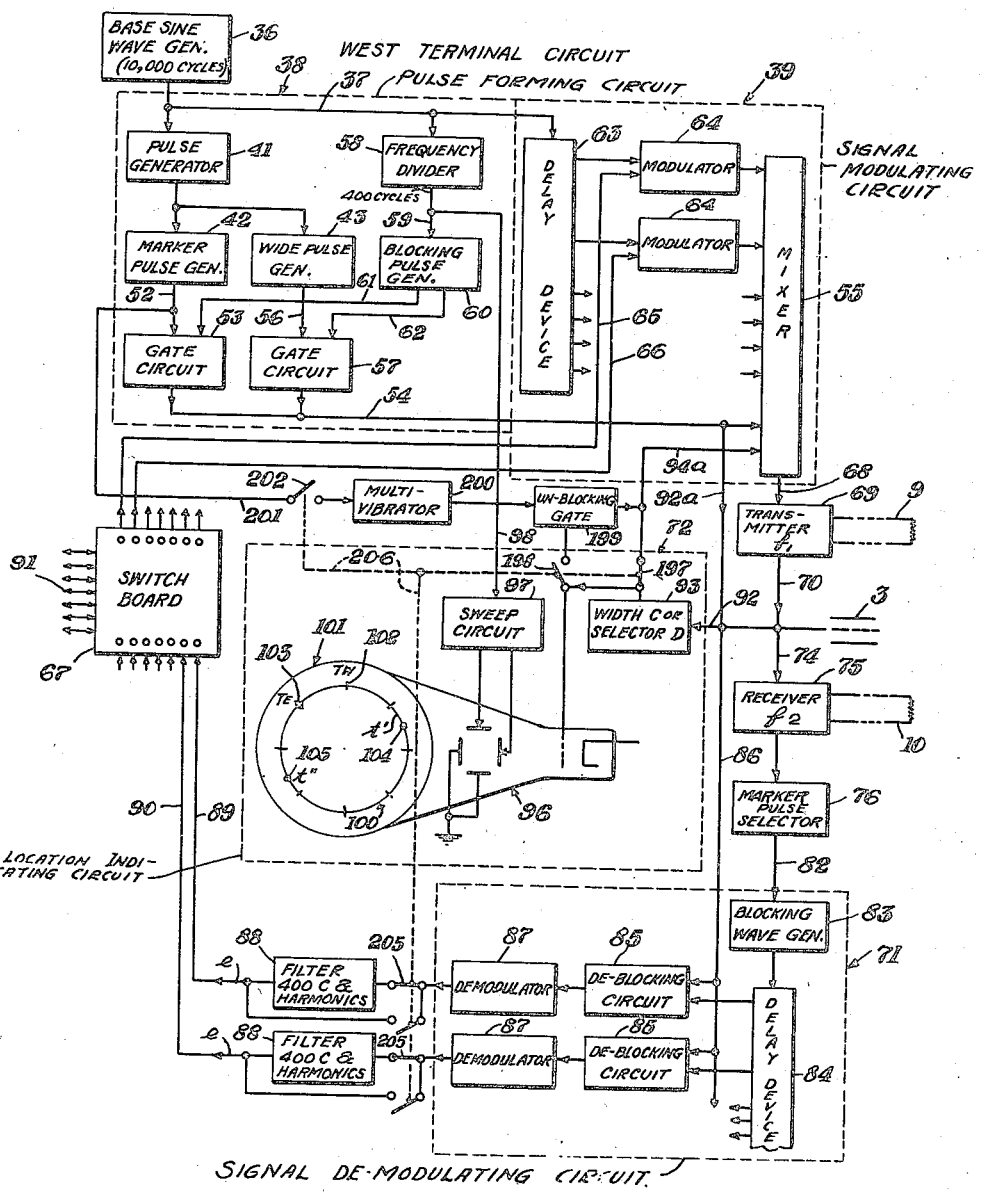

June 6, 1950 H. G. BUSIGNIES 2,510,066
VEHICLE COMMUNICATION SYSTEM
Filed Jan. 16, 1946 8 Sheets-Sheet 3

INVENTOR.
HENRI G. BUSIGNIES
BY
*R. P. Morris*
ATTORNEY

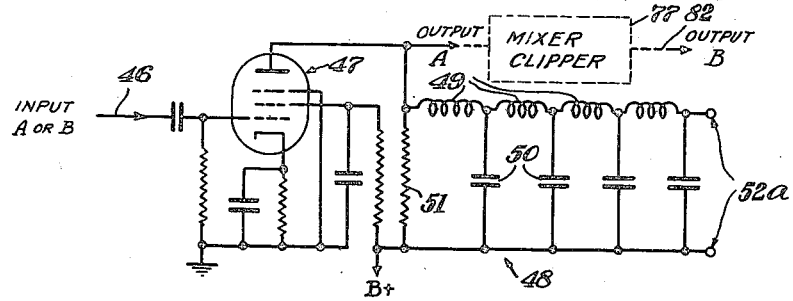
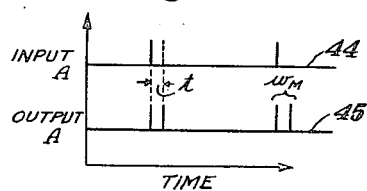
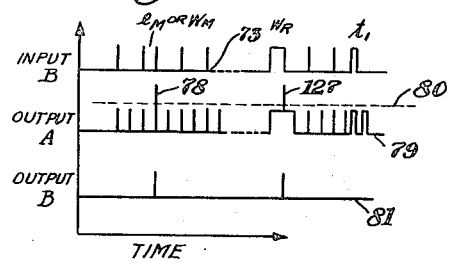
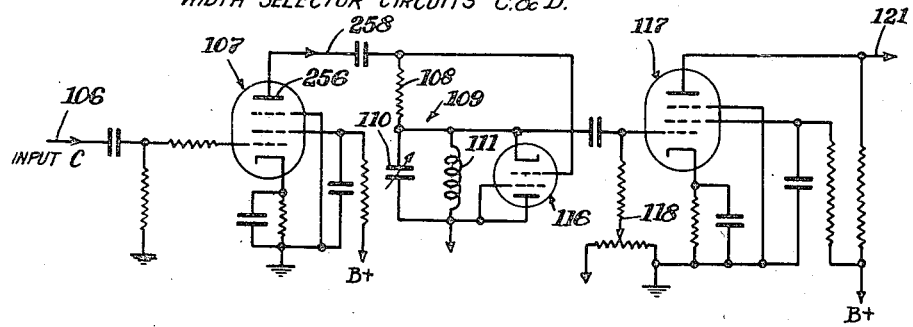
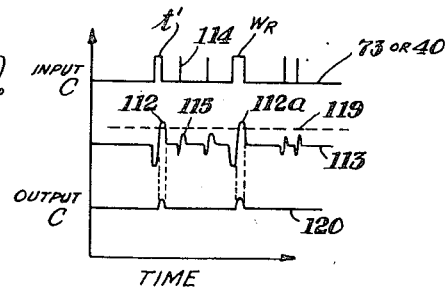
INVENTOR.
HENRI G. BUSIGNIES

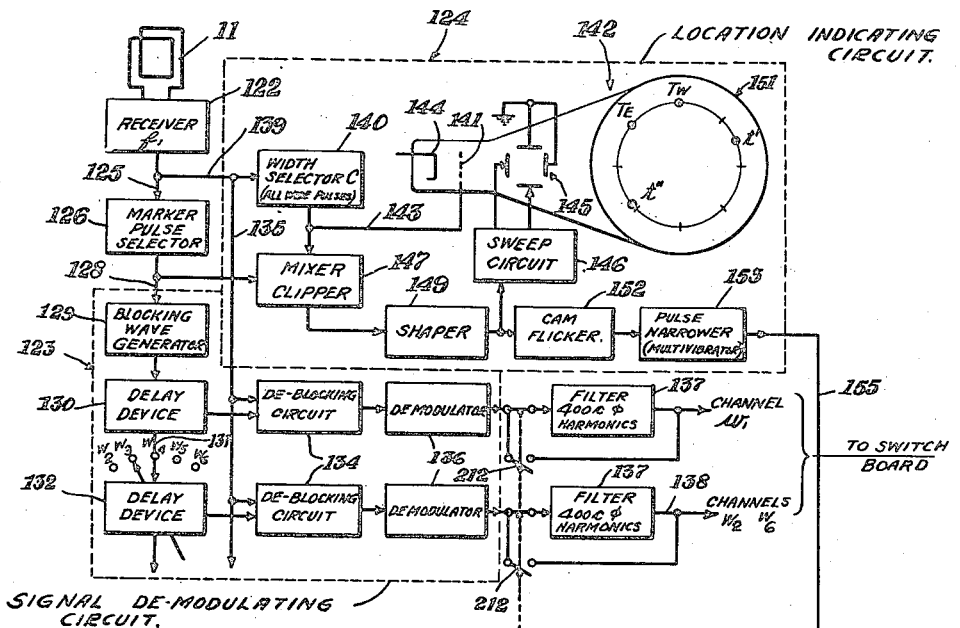

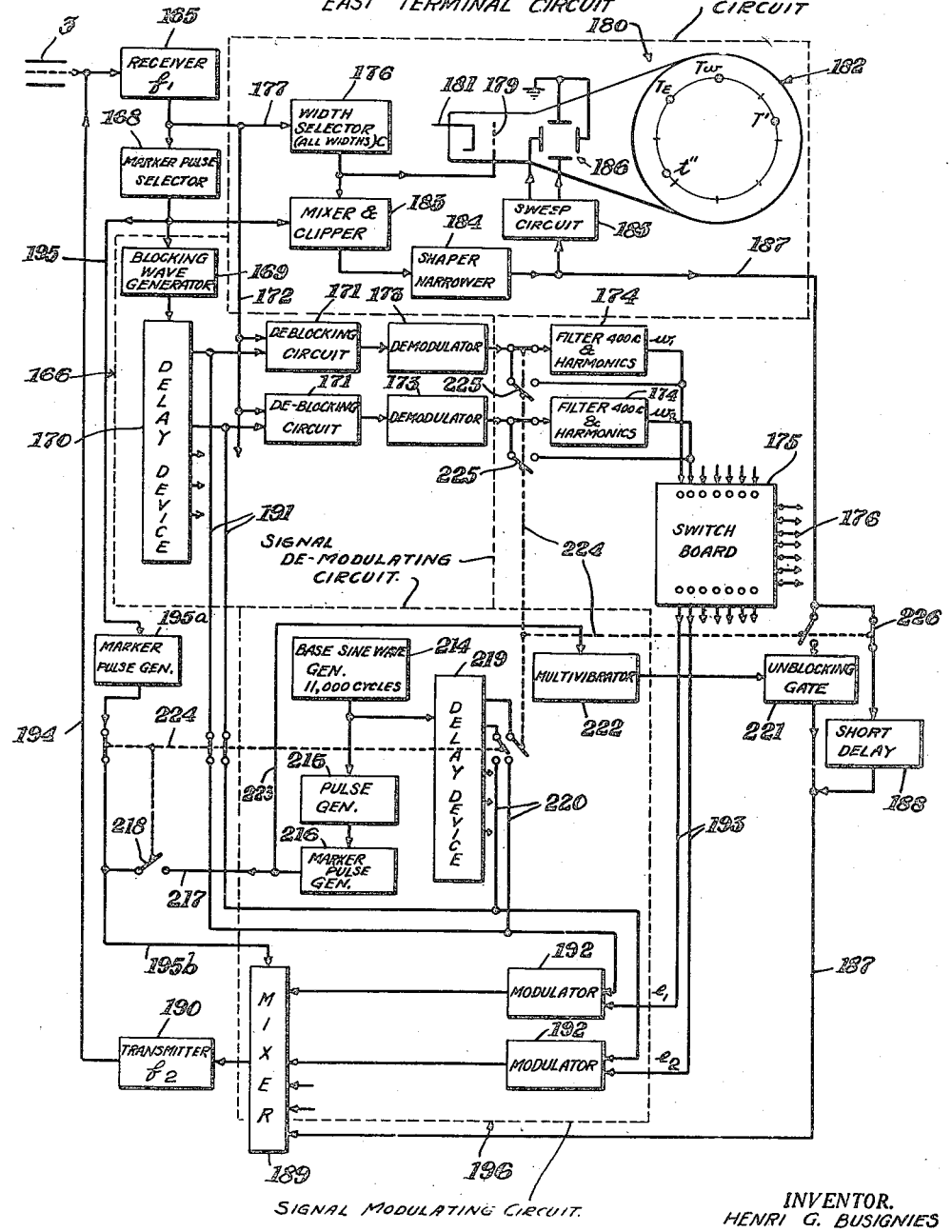

June 6, 1950     H. G. BUSIGNIES     2,510,066
VEHICLE COMMUNICATION SYSTEM
Filed Jan. 16, 1946     8 Sheets-Sheet 8

INVENTOR.
HENRI G. BUSIGNIES
BY
R. F. Morris
ATTORNEY

Patented June 6, 1950

2,510,066

UNITED STATES PATENT OFFICE 2,510,066

VEHICLE COMMUNICATION SYSTEM

Henri G. Busignies, Forest Hills, N. Y., assignor to Federal Telephone and Radio Corporation, New York, N. Y., a corporation of Delaware Application January 16, 1946, Serial No. 641,581

47 Claims. (Cl. 250—9)

This invention relates to radio communication systems for vehicles moving along a fixed route. More particularly it deals with a high frequency cable and radiating means adapted for multi-channel telephone and signal communications for vehicles such as trains including means for indicating the location of the vehicles along the route.

It is an object of this invention to communicate with vehicles in a novel and effective manner.

It is another object to signal the operator of the vehicle in a novel and effective manner so as to give him more information than he could obtain by other previously employed signalling systems.

Another object is to provide means for keeping the operator of a vehicle in continuous contact with the dispatcher of the vehicle.

Another object is to communicate between two or more vehicles operating along a fixed route.

Another object is to provide a continuous multi-channel telephone, telegraph and/or facsimile communication with a plurality of vehicles along a fixed route.

Another object is to provide continuous communication for trains and other vehicles along a fixed route which is uneffected by tunnels, bridges, or the like.

Another object is to provide one or more telephone channels for vehicles, such as railroad train Pullman cars.

Another object is to indicate continuously, instantaneously, and simultaneously the location of vehicles along a fixed route at a fixed station or stations, or in one or more of the vehicles, or both.

Another object is to indicate the speed and direction of one or more vehicles along a fixed route at a terminal or in the vehicles, or both.

Another object is to provide a low-power consuming system for carrying out the above objects.

Still other objects will appear from time to time in the description which follows.

The communicating system of this invention adapted for vehicles following a fixed route comprises the following essential elements: (1) a terminal radio transmitter and receiver; (2) a line or cable for carrying video and higher frequency signals from the terminal along the route; (3) decouplers, which may include repeaters and/or radio transmitter-receivers, located at spaced intervals along the cable for connecting the cable with radiating means, such as radiating transmission lines, which parallel separate sections of the route; and (4) a radio transmitter-receiver on each vehicle, having an antenna radiation coupled with the nearest radiating means on the cable along the route.

This communicating system is adapted for the transmission and reception of operational, safety, and general communication signals to, from, and between vehicles, including the communication of one or more facsimile channels, a plurality of telegraph channels, a plurality of telephone channels, and a channel for indicating the location, direction and/or speed of each vehicle, such as by quasi-radar or other means hereafter described. The vehicles may be of any type which can pass along a fixed route, such as an automobile, a bus, a truck, a railroad train, an airship, or a boat.

The main radio-transmitter and receiver terminal, hereinafter referred to as the west terminal, comprises: means for modulating signal energies of different types on a radio wave having a frequency of at least video frequency, and transmitting this high frequency wave over the cable and radiating means along the route. This terminal also includes means for receiving a similar modulated high frequency wave having a different frequency from that of the transmitted wave, including means for demodulating the signals on the received wave to indicate intelligence from the vehicles along the route or other terminal stations along the route, as well as means for indicating the location, speed, and direction of the vehicles along the route. For two-way communication to and from a vehicle or other terminals it is desirable to have two separate carrier waves of different frequencies, one for incoming signals, and the other for outgoing signals.

Any received radio wave may be demodulated and/or re-transmitted from another terminal station along the route, or at the other end of the route hereinafter referred to as the east terminal, or if desired, it may be transmitted from any one or more of the vehicles along the route. These other terminals along the route may be spaced any desirable distance apart, for example 50, 100, or 200 miles.

The signals on the carrier waves are preferably modulated on pulses which may be amplitude, frequency, or time modulated. Time modulated pulses are preferred in that they may be more easily transmitted with less distortion and may be easily distinguished in shape, such as width, from each other and other signal channels including location-indicating and echo pulses and synchronizing pulses. The time modulated signal, channel pulses may be made very narrow, that is ½ to one microsecond in duration and thereby require very little energy for their transmission. A preferred form of a modulated carrier wave comprises (1) a channel of synchronizing pulses interleaved with a (2) plurality of channels of signal modulated pulses, as well as (3) location-indicating pulses, wherein the three different classes of pulses may be readily distinguished from each other in some characteristic, such as by width. One out of every given number of synchronizing pulses may comprise a location-determining or radar pulse which radar pulse may be transformed in shape or width, different from the signal, synchronizing, and radar pulses, by the vehicle receiving it, and then be retransmitted as a location-indicating or echo pulse.

If the interleaved trains of channel pulses are composed of high frequency components at a video or higher frequency, (say as high as 10 megacycles), it is not necessary that the pulses be modulated on a radio carrier frequency, since they then may be directly transmitted over the cable or other carrier medium and radiating means along the route. If their frequency, however, is below video frequency, it is desirable that the pulses be modulated on a radio frequency carrier which may have a frequency of say about 500 to 5,000 megacycles. The frequencies of the pulses on the carrier waves of the incoming and outgoing signals may or may not be in synchronism depending upon whether the location-indicating or echo pulses are carried at random or in a separate channel over the carrier medium. If the echo pulses are carried at random over the carrier medium they may interfere with one or more of the signal channels, producing an audio hum after the signal channel pulses have been demodulated. However, this hum may readily be filtered from the audio signal without materially effecting its intelligence.

The location indicating device coupled with the receiver in the west terminal may comprise (1) a quasi-radar indicating device, such as a cathode ray tube having fluorescent screen, or (2) it may comprise a panel having lights or the like corresponding to each different section along the route. In the quasi-radar system, the sweep circuit of the cathode ray tube may be so synchronized and the fluorescent screen of the tube may be so calibrated, that one sweep of the beam across or around the screen corresponds in time to the length of the route or section thereof, such as between it and the next terminal along the route. The vehicles may produce bright dots along the calibrations of the screen corresponding to and located along the route. The speed and the direction of the vehicle along the route may be indicated by timing the motion of the dot over the screen of the cathode ray tube. In the other location indicating system the route may be divided into sections or blocks, each of which may produce an identifying signal, such as by reshaping a radar or other location-determining pulse transmitted from the vehicle. This identifying signal may then be selected to indicate, such as by a light on a panel at the terminal, that section or block in which the vehicle is located. If desired, the bright spot on the cathode ray screen or the light on the panel may flicker according to a given code to identify and distinguish one vehicle from another along the route. These received location-indicating and echo pulses at the main terminal may be again transmitted over the outgoing transmission medium to operate similar indicating devices at the other stations and/or in the vehicles along the route. In view of the retentivity of the fluorescent screen and/or in view of the persistance of human vision the recurrence frequency of the radar and location-indicating pulses of this system may be much lower than the audio, telegraphic, or facsimile channel pulses on these waves.

In order to keep in constant contact with the operator of the vehicle and the dispatchers at the main or west terminal, it is desirable that at least one signal channel be continuously coupled from the west terminal to all of the vehicles along the route. Over this channel operational instructions, warning signals, and the like, may be conveyed instantaneously by the dispatchers to all the vehicles. This channel may also be used to notify the vehicles what channels are available over which they may send messages to the terminal for connection to outside communication facilities or to communicate with another one or more of the vehicles along the same route. Correspondingly, separate signal channels should be provided for each vehicle along the route so that the operator in the vehicle may be in continuous contact with the dispatcher at the terminal.

The line or cable from the terminal along the route should be capable of carrying waves of video and high frequencies including radio frequency waves with as little loss of energy by radiation or other means as possible. Such a line or cable may be shielded such as a coaxial cable. In order to reduce the power required at the terminal transmitter there may be placed along the cable a plurality of simple low power repeaters for amplifying the channel pulses. There may be provided separate cables for the two different carrier frequencies, or a single cable may be provided wherein the repeater separates the two carrier frequency waves and separately amplifies them in their respective directions of travel. These repeaters may be powered from independent energy sources, such as an electric line specifically for that purpose, any local power line, electricity carried in the cable itself, storage batteries, or the like.

At spaced intervals along the route decouplers are provided for coupling the cable to a radiating means such as a radiating transmission line which extends along the route, within about 10 or 20 feet of the path of the vehicles, for radiating the energy to the vehicles. Separate radiating means may be provided for each of the two carrier frequencies transmitted over the cable. However, one radiating means may be used if it is blocked from transmitting when receiving, and vice versa. The radiating means preferably extend along the route from one decoupler to the next adjacent decoupler along the route. The decouplers may also include a repeater and/or a radio frequency transmitter and receiver of low power, say one or two watts. Furthermore, the decoupler may comprise means for identifying its position or its block along the route. The power for operating the decouplers may be supplied by any one of the means previously mentioned for operating the repeaters.

Each vehicle is provided with a transmitter and receiver similar to that provided at the terminals and may also include an indicating device of the type previously described. The radio transmitter-receiver on the vehicle is radio-coupled to the nearest radiating means along the route through a suitable antenna or loop for gathering the radiated energy from the radiating means. It is desirable that separate antennas be provided for the separate radiating means, one for each carrier frequency. The vehicle transmitting equipment operating at the outgoing frequency may also be coupled to receive synchronizing pulses so that the signal channels to be transmitted from the vehicle may be inserted in the proper channels of the outgoing frequency wave.

The transmitter and receiver circuits on the vehicle also include modulating and demodulating circuits, location pulse selecting circuits, synchronizing pulse selection circuits, and means for reshaping the radar pulses into location-indicating or echo pulses for retransmission on the outgoing frequency. A suitable cam flicker arrangement may be inserted in the location-indicating pulse forming a circuit to identify each vehicle. If a separate channel is provided for location-indicating pulses the reshaped radar pulses may be blocked except when this channel is in synchronism with these reshaped pulses. In such a system the recurrence rate channel pulses in the two carrier waves is slightly different so that the location-indication channel will pass all of the channel positions on the other wave a sufficient number of times each second so as to transmit sufficient echo pulses to provide an intelligible signal at the terminal location-indicating device.

The communication system of this invention may be adapted for one or more fixed parallel routes, or separate systems may be installed for each route. It is immaterial whether or not the route carries vehicles travelling in the same or opposite directions.

These and other objects and features of the invention will become more apparent upon consideration of the following detailed description to be read in connection with the accompanying drawings in which:

Fig. 1 is a schematic diagram of portions of the system of this invention adapted for use along the railroad track;

Fig. 2 is a schematic block diagram of a repeater used in the single coaxial cable system shown in Fig. 1;

Fig. 3 is a schematic block wiring diagram of a decoupler coupled to the coaxial cable shown in Fig. 1;

Fig. 4 is a schematic block wiring diagram of the main or west terminal circuit shown in Fig. 1;

Fig. 6 is a marker pulse generator and selector circuit diagram employed in the system of Fig. 4;

Figs. 7 and 8 are graphs of wave forms instrumental in explaining the operation of Fig. 6;

Fig. 9 is a schematic wiring diagram of a pulse width selector circuit employed in the circuits of Figs. 4, 11, 12 and 16;

Fig. 10 is a graph of wave forms useful in explaining the operation of the circuit in Fig. 9;

Fig. 11 is a schematic wiring diagram of a transmitter-receiver circuit employed in the vehicle, such as the train shown in Fig. 1;

Fig. 12 is a schematic wiring diagram of the East terminal circuit shown in Fig. 1;

Fig. 14 is a block wiring diagram of a cable decoupler circuit, similar to that shown in Fig. 3, adapted for use in a modification of this invention.

Fig. 15 is a graph of wave forms useful in explaining the operation of the circuit of Fig. 14;

Figure 5:
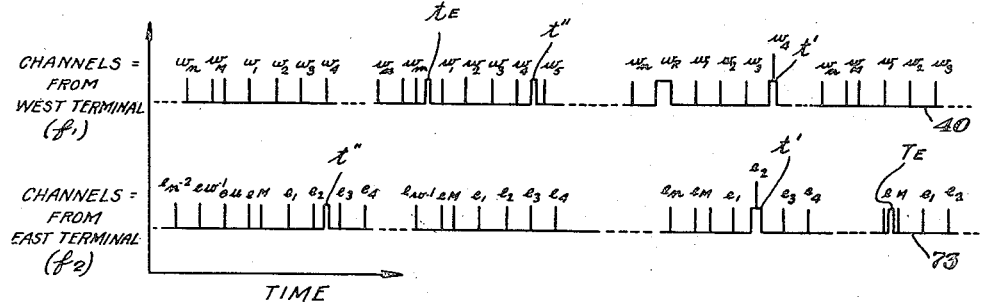
Fig. 5 is a graph of wave forms useful in explaining the operation of the system shown in Fig. 4.

For the purpose of illustration and simplicity, the system of this invention will be described as adapted for use in a communication system for railroad trains. This description will be divided into two major sections, the first of which has two modifications:

Chapter IA dealing with a quasi-radar pulse location and communication system wherein the radar pulses may appear in any position over the carrier medium and may interfere with signal channels (illustrated in Figs. 1–12);

Chapter IB dealing with a quasi-radar pulse location and communication system wherein the radar pulses are assigned a definite channel on the carrier medium and do not interfere with other signal channels (illustrated in Figures 4, 11, 12, and 13); and Chapter II dealing with a system for signal communication and location of trains in different blocks or sections along the route (illustrated in Figs. 14–21).

CHAPTER IA

(1) THE LINE CIRCUITS

Referring to Fig. 1 there is diagrammatically shown a west terminal 1, which will be considered a main terminal, and an east terminal 2 connected by a single coaxial cable 3 along a railroad right-of-way 4 upon which is shown a train 5. At spaced intervals along the cable 3 there is shown a repeater circuit 6, a decoupler circuit 7, and a combination decoupler and repeater circuit 8. From the west terminal 1 and from each of the decouplers 7 and 8 there is shown a pair of radiating transmission lines 9 and 10 which extend along each section or block of the track 4 to form a radio coupling with the antennas or loops 11 and 12, respectively, on the train 5.

The radiating transmission lines 9 and 10 may comprise a pair of spaced parallel conductors which terminate in a high impedance 13. The spacing should be maintained as constant as possible to avoid energy loss, particularly if the wires are closer together than about 6 inches. The radiating transmission lines 9 and 10 should extend the complete length of each section along the track and should not be more than about 20 feet away from the antennas on the trains at all times and the closer the better. They may be supported on line poles along the track or other means. The two pairs of radiating lines may both be located vertically one above the other on the same side of the track or one each side of the track as desired. The train, meaning the locomotive or any one or more cars in the train, should carry the antennas 11 and 12, as close as possible to their corresponding radiating means 9 and 10 but they may be located on top, or on either or both sides of the train. By using the close spacing relatively low power may be used, so that radiation fields are ineffective at distances from the track.

The repeater circuit 6 which may be placed at intervals along the single cable 3 to maintain a strong signal the full length of the route may comprise a two-way filter amplifier circuit as shown in Fig. 2. The frequency of the carrier wave from terminal 1 will be hereinafter referred to as $f_1$ and the frequency of the carrier wave from terminal 2 will be referred to as $f_2$. Thus, the $f_1$ carrier wave in the cable 3 from the west terminal passes through line 14 to the $f_1$ filter 15 wherein it is selected from the $f_2$ frequency in cable 3. The separated $f_1$ carrier then passes through line 16 to a suitable amplifier 17, preferably of about one watt or less, which may be supplied with power from any suitable source along the railroad or through the cable 3. The amplifier 17 passes the amplified $f_1$ wave through line 18 into cable 3 again for further transmission. The $f_2$ carrier wave from the east terminal in line 3 is withdrawn through line 19 into the $f_2$ filter 20 wherein it is separated from the $f_1$ wave and then amplified in amplifier 21, similar to 17, for further transmission through line 22 to the cable 3. The impedance of filter 15 and amplifier 21 should be matched with that of the cable 3 entering these two circuits toward the west, and similarly the impedances of amplifier 17 and filter 20 should be matched with the impedance of the cable 3 toward the east. If desired, separate matching impedances may be inserted at the ends of the cables 3 which are joined to lines 14 and 22, and 18 and 19, respectively.

If separate cables are used for the two directions of transmission the repeater circuits need only comprise amplifiers, since no separation of the waves is necessary.

The decoupler 7, also coupled to the cable 3, may comprise a circuit similar to that shown in Fig. 3 wherein the carrier wave $f_1$ from the west is passed from cable 3 through the filter 23 for separating wave $f_1$ from wave $f_2$. The separated wave $f_1$ may then be passed directly into the decoupler 24, and if the frequency of wave $f_1$ is sufficiently high and of sufficient strength it may be passed directly through line 25 into the radiating means 9. However, if the frequency is too low to radiate, it should be passed through a suitable radio frequency transmitter 26 for modulation on a radio frequency wave which is then radiated in the radiating means 9 extending along the track 4.

Similarly, the carrier wave $f_2$ in cable 3 from the east is separated in the filter 27, and may be directly passed to the decoupler 28. Then, the separated wave is passed through line 29 into a marker pulse selector 30 which separates the synchronizing or marker pulses from the signal modulated pulses on the wave from the east terminal 2. These separated marker pulses then are passed to a transmitter 31 for transmission at a suitable radio frequency over the radiated transmission line 10, if they are not of sufficiently high frequency for direct transmission from the line 10. The reason for transmitting these marker pulses is to synchronize the transmitter on the train so that the signals from the train may be properly interleaved in the available channels on the carrier wave $f_2$.

Also, connected to the radiating means 10 is a receiver 32 of any suitable design, which may, if the frequency of the received signal is sufficiently high, be only a coupler for coupling the received impulses from the antenna 10 to the cable 3 through line 33. However, if the received impulses are not modulated on a wave of frequency $f_2$, they may be detected and remodulated in a suitable radio receiver circuit, which may be a crystal type detector and may even be a superheterodyne circuit.

To prevent the transmitted selected pulses from transmitter 31 from being passed directly into the receiver 32 the receiver 32 is blocked while the transmitter 31 is transmitting by means a suitable blocking circuit coupled to line 31a.

If desired the circuit shown in Fig. 3 may be modified to include a repeater by inserting after the filters 23 and 27, respectively, amplifiers 34 and 35 such as described in Fig. 2.

(2) THE WEST AND MAIN TERMINAL CIRCUIT (a) *The train circuits*

Referring now to the west main terminal circuit schematically shown in Fig. 4, the base wave generator 36 may comprise a sine wave generator having a frequency of, say about 10,000 cycles, which base sine wave is then passed through line 37 to a marker and radar pulse forming circuit 38 and a signal modulating circuit 39, from which circuits is produced a complex multichannel pulse wave 40 shown in Fig. 5. On this wave 40 are shown: a marker pulse channel $w_M$ which may comprise a pair of closely spaced pulses of short duration; a plurality of time modulated signal channel pulses $w_1, w_2, w_3, \ldots w_n$; a location or radar pulse $w_R$ which takes the place of one marker pulse $w_M$ but may have a frequency much lower than that of the marker pulses, that is, one in out of every 25 marker pulses may be a radar pulse; vehicle or train location pulses $t'$ and $t''$; and may also have the next or east terminal location pulse $T_e$.

The marker and radar pulse forming circuit 38 produces the pulses $w_M$ and $w_R$ as follows: The sine wave from generator 36 is passed into the pulse generator 41 in which is produced a pulse wave having a frequency of, say, 10 000 cycles. This pulse wave is then passed into a marker pulse generator 42 as well as a wide pulse generator 43. The marker pulse generator 42 may comprise a circuit similar to that shown in Fig. 6 for producing from the pulse wave 44, shown in Fig. 7, a pair of pulses to form the marker pulse wave 45, shown in Fig. 7.

Tracing the pulse wave 47 through the circuit in Fig. 6, it is passed through line 46 into a suitable decoupler and amplifier tube 47 from the plate of which tube is withdrawn a pulse wave similar to wave 44. This wave 44 is passed into the open-ended delay line 48 comprising a network of inductances and condensers 49 and 50, respectively, which delays the wave 44 an amount $t$ as shown in Fig. 7. The closed end of the delay line 48 is bridged with a balanced impedance 51 to prevent further reflections of the pulse wave. The open-end 52a of the network 48 prevents inversion of the pulses reflected therefrom. The reflected delayed pulse wave and the original pulse wave from the plate of tube 47 are then mixed to produce the double marker pulses on wave 45 which is withdrawn through line 52

This double marker pulse wave 45 is then passed into gate circuit 53, shown in Fig. 4, which is normally maintained open for passage of the marker pulses through line 54 to the mixer 55, referred to later.

The wide pulse generator 43 may comprise a suitable multivibrator or similar trigger circuit for producing the pulses $w_R$ which must be at least as wide as the outside edges of the pair of marker pulses $w_M$ produced in the circuit 42. These marker pulses $w_R$ are passed through line 56 into gate circuit 57 which is normally closed, except for one time out of every 25 consecutive the marker pulses $w_M$, at which time the gate 53 is closed and the wate 57 is opened for the insertion of the pulse $w_R$ in place of that marker pulse $w_M$.

The control of the gate circuits 53 and 57 may be accomplished by dividing the sine base wave from generator 36 in the frequency divider 58 to produce a wave having 400 cycles which is then passed through line 59 to the blocking pulse generator 60 which then controls the gates 53 and 57 through lines 61 and 62 as previously described. Thus, every 25th marker pulse may be a wider radar pulse $w_R$ which is passed through line 54 into the mixer 55.

The signal modulating circuit 39 may comprise a suitable delay device 63 for delaying the sine wave from generator 36, different amounts to produce a series of delayed sine waves out of phase with each other and marker pulses $w_M$. The resulting delayed sine waves may then be modulated in a suitable modulator 64 according to signals $w_1, w_2, w_3 \ldots w_n$ introducing into the modulators over lines 65 and 66, etc., from a switchboard 67.

The details of the various devices indicated by block symbols, in the several circuits, may take the forms disclosed more fully in Reeves and Beatty patents, Nos. 2,266,401 and 2,300,394 respectively. The time modulated pulse trains from modulators 64 are passed into the mixer 55 from which is withdrawn the resulting modulated multichannel pulse wave 40 through line 68 to a suitable decoupler or $f_1$ transmitter 69 coupled to a radiating transmission line 9 and to the coaxial cable 3 through line 70.

Signals $w_1, w_2 \ldots w_n$ which may be transmitted over the wave 40 may comprise a single channel for signaling the operator of each train, which channel is continuously and simultaneously connected to all of the trains and over which channel the dispatcher at the main terminal 1 may control the movement of the trains, either through the engineer or the conductor, or automatically. This signal channel may be an audio, a telegraphic or a facsimile channel, or separate chanels may be provided for each of these types of communication to the operators of the trains. Since telegraphic channels do not require as wide a frequency band as audio channels, one audio or telephone channel may be divided into several telegraphic channels. The other audio signals channels may be connected to separate telephones in each train, such as telephone in Pullman cars for use of passengers.

*(b) The receiver circuits*

The receiver portion of the west terminal circuit is also coupled with the coaxial cable 3, and may comprise a signal modulator circuit 71 and a location indicating circuit 72. The received carrier wave $f_2$ on which is modulated signals from the trains and the east terminal 2 may be graphically represented as wave 73 in Fig. 5. This wave is passed from line 3 through line 74 or is received directly over the radiating transmission line 10, both connected to a suitable $f_2$ receiver 75. This receiver may comprise an $f_2$ filter and decoupler circuit, and/or a radio detecter for the carrier wave $f_2$. The received wave 73 is then passed into the marker pulse selector 76 to remove the double marker pulses $e_M$ shown thereon for synchronizing the demodulator circuit 71.

The marker pulse selector circuit may comprise the decoupler amplifier 47 and reflecting delay line network 48 previously described in Fig. 6, plus a mixer-clipper 77. In this circuit the received wave 73 shown in Fig. 8 is mixed with the same wave delayed sufficiently to cause the first one of a pair of the marker pulses $e_M$ to be super-imposed upon the second one of a pair of the marker pulses to produce a double amplitude pulse 78 as shown on wave 79, in Fig. 8. The double amplitude marker pulse 78 is then clipped above the level 80 in the mixer-clipper 77 to produce a pulse train 81 which may then be passed through line 82 into a blocking wave generator 83 for synchronizing the demodulator circuit 71.

A suitable demodulator circuit may comprise a delay device 84 for producing a series of delayed blocking waves for separating each of the signal channels on the wave 73. These delayed blocking waves are then mixed in the deblocking circuits 85 with the original wave 73 coupled through line 86 for separating each signal channel into a train of signal modulated pulses. These separated trains are then passed into the separate demodulator circuits 87 to reproduce the audio or other signals modulated thereon.

The resulting modulated signals may then be passed through hum filters 88 to remove the hum caused by the interference of the wider location indicating or echo pulses $t', t'', T_E$, etc., on the wave 73. Since the recurrence of these echo pulses occurs only 400 times a second, the filters 88 may be constructed to remove only the vibrations of 400 cycles and its harmonics, namely, 800, 1200, 1600, etc., cycles. The sharp removal of vibrations at these particular frequencies from the demodulated audio signals $e_1, e_2, \ldots e_n$ does not materially affect their quality or interfere with their intelligence. The resulting filtered audio signals may then be passed through lines 89 and 90 to the switchboard 67 from which they may be coupled to outside telephone or signal circuits through lines 91 or transmitted again through the outgoing channels 65, 66, etc., to other trains or points along the railroad, such as the east terminal.

*(c) The location indicator circuit*

The location indicator circuit 72 is directly coupled to cable 3 through line 92 and comprises a width selector circuit 93 for separating the location indicating or echo pulses $t', t'', T_E$, etc., from the wave 73. All of these echo pulses have been made wider than the signal modulated pulses $e_1, e_2 \ldots e_n$ or either one of the pair of marker pulses $e_M$, and the width of these echo pulses is one less than the distance between the pair of marker pulses $e_M$. Thus, these echo pulses will not interfere with or be selected by the marker pulse selector 76.

The width selector circuit 93 may comprise a circuit similar to that shown in Fig. 9. The positive pulses in the wave 73, shown again for convenience in the graph in Fig. 10, is introduced at 106 into the amplifier tube 107. From the plate of amplifier tube 107 the wave 73 is passed through resistance 108 into the time constant circuit 109 comprising a variable condenser 110 and inductance 111. This time constant circuit 109 is tuned to frequency corresponding in time to twice the width of the narrowest width pulse to be selected. For example, the excitation of the circuit 109 by the leading positive edge of pulse $t'$ causes an undulation on wave 113 (shown in Fig. 10) to be produced from circuit 109. The trailing edge of pulse $t'$ corresponds exactly to the center zero position of this undulation so that the positive undulation 112 is not counteracted but is aided by any change in potential of the trailing edge of pulse $t'$ on wave 73. The next pulse 114 in wave 73, which is narrower than pulse $t'$, produces a much smaller undulation 115 on the wave 113, since shortly after the circuit 109 is excited by the positive leading edge of pulse 114 it is counteracted by the trailing edge of the same pulse, thus preventing the positive undulation 115 from reaching as high a potential as the undulation of pulse 112.

To prevent the circuit 109 from continuing its oscillations there is inserted a damping tube 116 from the cathode of which is withdrawn the wave 113 above referred to. This wave then passes into a suitable clipper circuit comprising a clipper tube 117 having a variable bias 118 for adjusting the clipping level 119 (shown in Fig. 10) to a value which will clip the undulations formed from the pulses to be selected and eliminate the others. The resulting output from the plate of tube 117 is illustrated by wave 120 which is withdrawn through line 121. The pulse wave 120 may be suitably shaped in a circuit not shown, before being passed through line 94a (shown in Fig. 4) and also 94, if desired.

Instead of the width selector circuit shown in Fig. 9 the marker pulse selector circuit shown in Fig. 6 may be employed for selecting pulses greater than a given width by delaying the train of pulses an amount in time equal to the widest pulse not to be selected, and then super-imposing the delayed pulse train on the original undelayed pulse train and clipping off the overlapping portions in a suitable mixer-clipper, such as 77. This operation of selector in Fig. 6 as a width selector will be further described in connection with a marker pulse selector 126 shown in Fig. 11 and the pulse 127 shown in Fig. 8.

The resulting separated location or echo pulses $t'$, $t''$, $T_E$, etc., are then passed through line 94 to the grid 95 of the cathode ray tube 96. This cathode ray tube is also provided with a rotating sweep circuit 97 synchronized by the original radar pulses $w_R$ formed from the frequency divider 58, through line 98. The electron beam produced in the gun 99 of the tube 96 may be caused to be deflected around the circle 100 shown on the screen 101. Every time a width pulse is passed through the width selector 93 the biased grid 95 causes the beam to produce a bright spot of light on the path 100. A scale may be placed over the screen 101 to measure the distance between the starting point $T_W$ or 102, corresponding to this west terminal and the bright spot 103 corresponding to the location of the east terminal caused by pulse $T_E$. This distance around the path 100 between 102 and 103 may be calibrated into separate blocks, miles or other units, as desired. The transmitted location or echo pulses from each of the trains along the track 4 will then produce bright spots 104 and 105 caused by pulses $t'$ and $t''$. Thus, the distance of these trains from either or both terminals is immediately and continuously indicated on the screen 101, and the speed and direction at which these dots move along the scale is directly proportional to the speed and direction of the trains along the track 4. If desired, the radar pulses $w_R$ may be passed from line 54 to line 92 through a line 92a to produce a bright spot $T_W$ at 102 on the scale 101.

The received location pulses $t'$, $t''$, $T_E$, $T_W$, etc., removed from the pulse wave 73 in the selector 93 may also be transmitted over wave 40 by connecting the selector 93 to the mixer 55 through line 94a. This produces the randomly placed pulses $t'$, $t''$, $T_E$, etc. on the wave 40.

(3) THE TRAIN CIRCUITS

In Fig. 11 is shown a schematic diagram of the receiver and transmitter circuits which may be employed in the train 5, operating along the track 4 shown in Fig. 1. This circuit comprises a receiver antenna 11 which is coupled to an $f_1$ receiver 122 for receiving the complex pulse wave 40 transmitted from the west terminal 1. This pulse wave 40 is passed into two separate circuits: a signal demodulating circuit 123 and the location indicating circuit 124.

(a) *The receiver circuits*

The received pulse train 40 is passed from receiver 122 through line 125 to a marker pulse selector 126 which selects pulses $w_M$ and $w_R$ from the wave 40. This marker pulse selector may be similar to the selector shown in Fig. 6. The radar pulse $w_R$ on wave 40 is selected similarly to the pulse $w_M$, as is shown in Fig. 8, because the width of the pulse $w_R$ is at least as wide as the outside edges of the pair of pulses $w_M$. Thus, at least a portion of the pulse $w_R$ delayed in the network 48 of Fig. 6 will overlap a portion of the original pulse $w_R$ to produce the increased amplitude pulse 127 which will be clipped in the mixer-clipper 77 to produce the pulse wave 81. This pulse wave 81 is passed through line 128 into the demodulating circuit 123 comprising a blocking wave generator 129, similar to generator 83 in Fig. 4. The resulting blocking wave is then passed through at least one fixed delay device 130 for separating the $w_1$ signal channel reserved for all and thence through line 131 to another or a selective delay device 132 which may be adjusted to select different receiving channels $w_2$, $w_3$, $w_4$, etc., as desired, by means of contacts 133 so that any one of these channels may be selected and deblocked from the incoming wave 40. The delayed blocking waves from the devices 130 and 132 are then passed into the deblocking circuits 134 where they are combined with the original received pulse wave 40 through line 135 to produce separate trains of pulses corresponding to the signal channels deblocked. These separated trains may be respectively passed to the demodulator circuits 136 for demodulation and thence through hum eliminators or filters 137 to remove the hum caused by an interference with the echo pulses $t'$, $t''$, $T_E$, etc. These filters 137 are similar to filters 88 of Fig. 4 previously described. From these filters may be withdrawn through lines 138 the signal $W_1$ and one or more other of the signal channels selected by the device 132 to a suitable intelligence converting device such as a telephone, or if desired, these signals may be passed through a switchboard (not shown) similar to 87 shown in Fig. 4. The delay device 132 may be operated by the same person who operates the switchboard on the train and the channel to be selected may be told the operator on the train over the fixed tuned channel $w_1$ continuously connected through delay device 130.

(b) Location indicator circuit

The location indicator circuit 124 is similar to the circuit 72 shown in Fig. 4 and is controlled by the location and wider pulses $t'$, $t''$, $T_E$ and $w_r$ on the wave 40 which is passed from the receiver 122 through line 139 to a width selector 140, similar to the circuit shown in Fig. 9.

Radar pulse $w_r$ is shown in Fig. 10 on wave 40 to be wider than pulse $t'$, but it produces an undulation 112a similar to that of 112 on wave 113 having a greater amplitude than the undulations produced by the pulses narrower than pulse $t'$. Therefore pulse $w_r$ is also selected with the pulse $t'$ and $t''$ on the wave 40. Thus by properly controlling the gate level 119 and the adjustments 110 and 118 all pulses wider than a certain width may be selected, referred to as the type "C" in the drawings.

The resulting selected wide pulses control the grid 141 of the cathode ray tube 142 through line 143. The sweep circuit for the rotating beam from the electron gun 114 of the tube 142 is controlled by the plates 145 through a sweep circuit 146. This sweep circuit 146 in turn is controlled by the wide radar pulses $w_r$ which may be selected from the width pulses from selector 140 by the mixer-clipper 147 coupled to the marker pulse selector 126 through line 148. The combination of the marker selector pulses from selectors 140 and 148 produces a pulse of increased amplitude corresponding to pulses $w_r$ which are clipped off in mixer clipper 147 and then may be passed through a suitable shaper 149 before being passed through line 150 to control the sweep circuit 146. Thus, the locations of both the east and west terminals as well as the trains along the track are shown as bright spots on the screen 151 of the tube 142.

Before the selected radar pulse $w_r$ is transmitted from the train as a location indicating or echo pulse $t'$, it may be reshaped, such as to narrow it say to about ½ the width of the pair of marker pulses, in a suitable multivibrator circuit 153 to prevent its selection as a marker pulse on the outgoing $f_2$ carrier wave. The reshaped and new echo pulse $t_1$ is then passed through line 155 to the transmitter through the mixer 156.

(c) The transmitter circuits)

The receiver 158 for synchronizing the transmitter 157 on the train are both coupled to the antenna 12. The $f_2$ receiver 158 only receives at least a portion of the marker pulses $e_M$ of wave 73 (as previously described in Fig. 3) to trigger the base wave generator 159 for synchronizing the transmitted pulses $e_1$, $e_2$, $e_3$ ... $e_n$. The base wave from generator 159 is passed into delay device 160 and then may be passed into an adjustable delay device 161, adjustable similar to the device 132 above mentioned. From these delay devices delayed waves are produced to control the signal modulator circuits 162 from which are withdrawn trains of pulse modulated signals corresponding to channels $e_1$ and $e_4$ which may be reserved for this railroad train. The signals $e_1$, $e_4$ ... $e_8$ to be modulated may be connected to a switchboard on the train (not shown). The resulting trains of signal modulated pulses are then passed to the mixer 156 to form wave 73 which is then transmitted over antenna 12 by the $f_2$ transmitter 157.

In order to prevent the transmitted signals from transmitter 157 from passing back into the receiver 158, the receiver 158 is blocked through line 163 when the transmitter 159 is transmitting.

(4) THE EAST OR OTHER TERMINAL CIRCUITS

(a) The receiver circuit

A circuit for the east terminal 2 shown in Fig. 1 is schematically disclosed in Fig. 12 wherein the $f_1$ receiver 165 is coupled to the cable 3 and receives the multichannel pulse train 40. This receiver may be similar to those previously mentioned coupled to the line 3, and may comprise a signal demodulating circuit 166 and a location indicator circuit 167, similar to that previously described on the train in Fig. 11.

From the receiver 165 the wave 40 is passed through a marker pulse selector 168, similar to selector 126 in Fig. 11, and thence into the circuit 166 comprising a blocking wave generator 169 and a delay device 170 from which is withdrawn a plurality of delayed waves corresponding to each of the signal channels on the wave 40. These delayed waves are separately connected to suitable deblocking circuits 171 to separate the channels from the wave 40 which is also coupled to circuits 177 through the line 172. These resulting separated pulse trains may then be separately demodulated in suitable demodulation circuits 173 and thence passed through filters 174, similar to filters 88 and 137 previously described, and from which they may be connected to a switchboard 175.

The location indicator circuit 167 may comprise a type "C" width selector 176, similar to selector 140, for selecting from the wave 40 introduced into line 177 all those pulses having a width equal to or greater than that of the location pulses $t'$, $t''$, $T_E$, etc. These pulses are then passed from the selector 176 through line 178 to the grid 179 of cathode ray tube 180 to control the electron beam from the electron gun 181 and to produce the spots on the target 182 of the tube 180. The rotary sweep circuit for the electron beam is controlled by pulse $w_R$ selected from the wave from selector C in the mixer-clipper 183 as previously described in Fig. 11. A shaper 184 may be inserted before the selected $w_R$ pulses trigger the sweep circuit 185 connected to the deflection plate 186 in the tube 180. The shaper 184, may also narrow the selected pulse $w_R$ so that it may have the same width as pulses $t'$ and $t''$, to produce pulse $T_E$ which is then passed through line 187, through a slight delay device 188, and thence to mixer 189 and $f_2$ transmitter 190 of the transmitter circuit for the east terminal.

(b) The transmitter circuits

The synchronization of the signal channel pulses from the east terminal may be the same as those channel pulses received from the west terminal. Thus, the same delayed waves from the device 170 that are used for deblocking the channels in the received wave 40, may be passed through line 191 to signal modulated pulses for the signals $e_1$, $e_2$, etc., from the switchboard 175 through lines 193. Similarly, as shown in switchboard 167 of the west terminal circuit channels from the west terminal, as well as outside channels through lines 176, may be connected to the signal channels $e_1, e_2 \ldots e_n$. The resulting signal modulated pulses from modulators 192 are then mixed in the mixer 189 and the resulting complex pulse wave 73 is passed into the $f_2$ transmitter 190 and thence back into the coaxial cable, through line 194.

The marker pulse $e_M$ on wave 73 may be in synchronism and made directly from the marker pulses $w_M$ selected in circuit 169. These selected pulses $w_M$ may be passed thru line 195 to a new marker pulse generator 195a and the resulting marker pulses may be then passed through line 195b into the mixer 189 and thence to transmitter 190. The delay device 188 is inserted in the line 189 to delay the echo pulse $T_E$ so that it will not superimpose or interfere with the marker pulses $e_M$ on the wave 73, thus produced in synchronism with pulses $w_M$.

As shown in Fig. 5, the location or echo pulses $t'$, $t''$, and $T_W$ occur along the pulse waves at random and may be even superimposed on one or more of the signal modulated channel pulses. However, such interference is, comparatively speaking, so rare that a loss of either or both of the interferring pulses cannot be readily detected after sound demodulation or projection on a rententive fluorescent screen of the cathode ray indicating device.

CHAPTER IB

Figure 13:
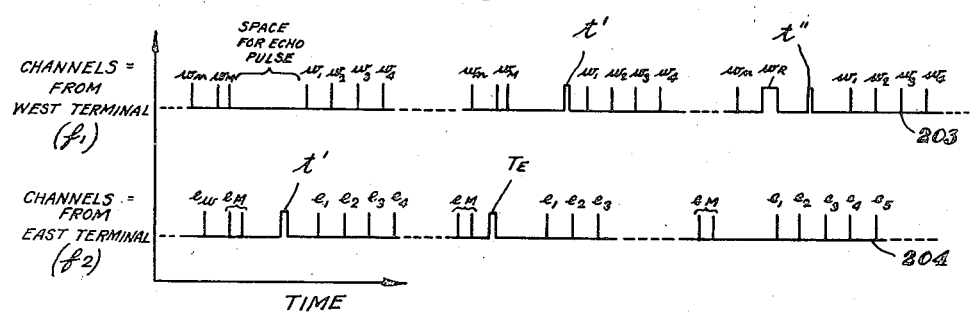
Fig. 13 is a graph of wave forms instrumental in explaining a modified operation of the circuits shown in Figs. 4, 11 and 12.

Instead of producing waves as shown in Fig. 5 wherein the echo and location indicating pulses occur at random over the transmission medium and may superimpose themselves on certain of the signal channel pulses, the circuit in Figs. 4, 11 and 12 may be modified to produce waves similar to those shown in Fig. 13 wherein a separate channel or space is reserved after each marker pulse pair for the insertion of the wide location indicating and echo pulses. This is accomplished by having the frequency of channel pulses on the $f_1$ wave from the west terminal slightly different from the frequency of the channels on the $f_1$ wave from the east terminal, and providing means for blocking the lines for transmitting the echo pulses except when the spaces reserved for them occurs. These changes may be accomplished by throwing the switches in each of the above mentioned Figs. 4, 11, and 12, which may be ganged or connected to the arms shown in heavy dotted lines.

(1) THE WEST TERMINAL CIRCUIT

Tracing this modification through the circuit in Fig. 4 the switch 197 in line 94a is opened and the switch 198 is closed so that the train of pulses from the width selector 93 must pass through the unblocking gate circuit 199 before being passed into the line 94a and to the mixer 55. This unblocking gate circuit may be controlled by a multivibrator 200 which is connected to the marker pulse generator 42 through line 201 and switch 202, which switch is now closed. The multivibrator 200 may be adjusted so as to be in synchronism with the first one or more signal channels occurring after each marker pulse on the wave 40 reserved for the pulses selected in selector 93. This is accomplished by unblocking the gate 199 during the time interval of the spaces reserved therefor controlled by the multivibrator 200. The time delay devices 63 and 84 are adjusted so that the signal modulated pulses occur at other than the spaces reserved for the location indicating pulses.

It is desirable that the frequencies of the pulses and particularly the marker pulses, on the wave 203 from the west terminal on the wave and 204 from the east terminal are sufficiently different so that the spaces for the location pulses on each wave will pass all the positions on the other wave at least 20 or 30 times each second so that a sufficient number of the echo pulses will be transmitted each second to produce an apparently continuously visual indication on the cathode ray tube screens of the location indicator devices. Since the echo pulses now all occur only in given channel along each pulse wave, the hum filters 88 are not required and thus may be shunted out by operation of the switches 205 coupled to the other mentioned switches by the heavy dotted lines 206.

(2) THE TRAIN CIRCUIT

Similarly, in Fig. 11 a similar unblocking gate 207 is provided in the line 155 for the location pulses $t'$. The gate 207 may be operated from the received synchronizing pulses $e_M$ on wave 204 from receiver 158 through line and switch 208 and multivibrator 209. The closing of the switch 208 opens the switch 210 and closes the switch 211 and cuts out the filters 131 through switches 212, all connected by the heavy dotted lines 213.

(3) THE EAST TERMINAL CIRCUIT

The east terminal circuit shown in Fig. 12, necessitates more modification than that of the previously described circuits in that it must produce a new base sine wave and frequency of marker pulses for the transmission of the signal pulses along the wave 204. This wave must contain marker pulses which are out of synchronism with the marker pulses of wave 203 produced from generator 36 shown in Fig. 4. This separate and new base sine wave generator is shown at 214 in Fig. 12 and may have a frequency say of 11,000 cycles which is 1,000 cycles greater than that of the generator 36. Such a difference in frequency will allow at least 30 of each of the different location pulse channel spaces to pass each portion on the other wave each second. The wave from generator 214 may be coupled to a pulse generator 215 and then into a marker pulse generator 216, similar to that shown in Fig. 6, to produce a train of pairs of marker pulses that is connected to the mixer 189 through line 217 by closing the switch 218.

The modulators 192 should be controlled by delayed waves from the generator 214, which waves may be produced in the delay device 219 and passed through lines 220 to the modulators 192. The unblocking gate 221 in line 187 prevents the east terminal location pulse $E_T$ from being continuously transmitted to the mixer 189. This gate 221 may be controlled by a multivibrator 222 coupled to the marker pulse generator 216 through line 223. The insertion of the above described circuits by operating the switch gauging means 224 disconnects the filters 176 by operating the switching means 225, disconnects lines 191 and 195, and disconnects the short delay device 188 by closing switch 226.

One advantage of the modification just described resides in the fact that hum filters 88, 137 and 174 are not required in the audio circuits of each of the demodulator circuits.

CHAPTER II

(1) THE LINE CIRCUITS

Instead of indicating the exact location of each train along track 4 there may be provided separate signal means in each decoupler circuit 7 or 8 for producing an identifying signal when a train transmits location indicating pulses to the radiating means of that particular decoupler corresponding to a given block or section of track. A decoupler circuit for providing such identifying signals is shown in Fig. 14 wherein two different frequency waves are separated and transmitted and received on the antennas 9 and 10. This decoupler may comprise filters 227, decouplers 228, transmitter 229 for the wave from the west terminal; and for the wave from the east terminal, marker pulse selector 230 (similar to 30 in Fig. 3), transmitter 231 (similar to 31 in Fig. 3) for the transmission of the marker pulses to the antenna 10, and receiver 232, blocked through line 231a when the transmitter is transmitting, for receiving the signals from the train. The pulses received from the train may be graphically shown in Fig. 15 as wave 233, comprising a location indicating pulse 234, which may or may not correspond to one of the marker pulses on the wave from the west terminal, and the signal channel pulses $e_1$, $e_2$, etc. The pulse 234 may be selected in the width selector 235 (similar to that shown in Fig. 9) to produce the wave 236 which may be passed into a shaper 237 which may comprise a multivibrator for widening or narrowing the pulse to a given width $W_3$ shown on wave 238. This width $W_3$ may correspond to that particular block decoupler circuit and when it is transmitted in place of the pulse 234 on the wave 233 it identifies the block in which the train is located. $W_3$ may be inserted for pulse 234 by combining waves 233 and 238 to produce pulse wave 239, and clipping the wave 239 above the clipping level 240 in a mixer-clipper 241 to transmit only that portion of the wave below level 240 forming pulse wave 242 withdrawn from clipper 241 through line 243 and passed into cable 3.

(2) THE WEST TERMINAL CIRCUIT

Figure 17:
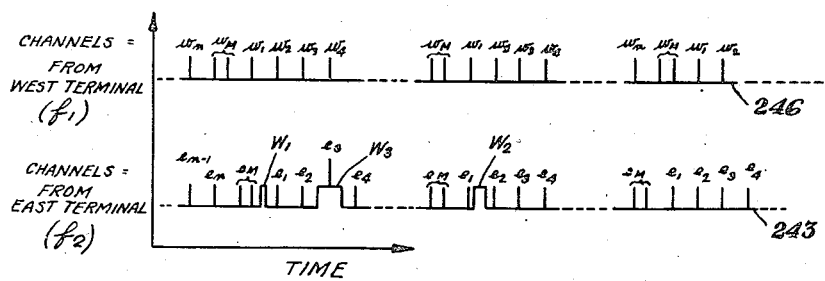
Fig. 17 is a graph of wave forms useful in explaining the operation of the modification shown in Fig. 16.
Figure 16:
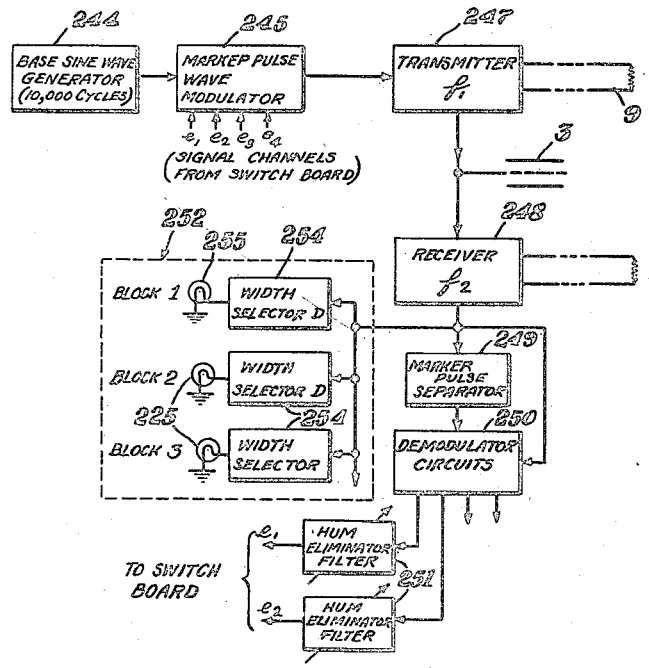
Fig. 16 is a block wiring diagram of a west terminal circuit adapted for use with the modification shown in Fig. 14.

A block wiring diagram of the west terminal circuit employed in this system of block location indicators is shown in Fig. 16 wherein the base sine wave generator 244 (similar to 36 in Fig. 4) controls the marker (and, if desired, also a radar type) pulse generator and a plurality of signal channel modulator circuits 245 (similar to 38 in Fig. 4) to produce a multichannel pulse wave 246, shown in Fig. 17. This wave 246 may be transmitted through $f_1$ transmitter 247 on to the lines 9 and the cable 3.

The $f_2$ multichannel pulse wave 243 from the east terminal received from cable 3 or line 10 in the $f_2$ receiver 248 may be passed through a marker pulse selector 249 (similar to that shown in Fig. 9) to a multichannel separator and demodulator circuit 250 (similar to 71 shown in Fig. 4) provided with hum eliminator filters 251, as previously discussed in Chapter IA.

The location indicator circuit 252 may be coupled to the receiver 248 through line 253 and may comprise a group of width selectors of the type "D," which select pulses only of a given width. These width selector circuits 254 are then connected to suitable indicating devices such as lights 255 for indicating in which block a given train is located. The flickering of the light may indicate which train is in that particular block.

Figure 18:
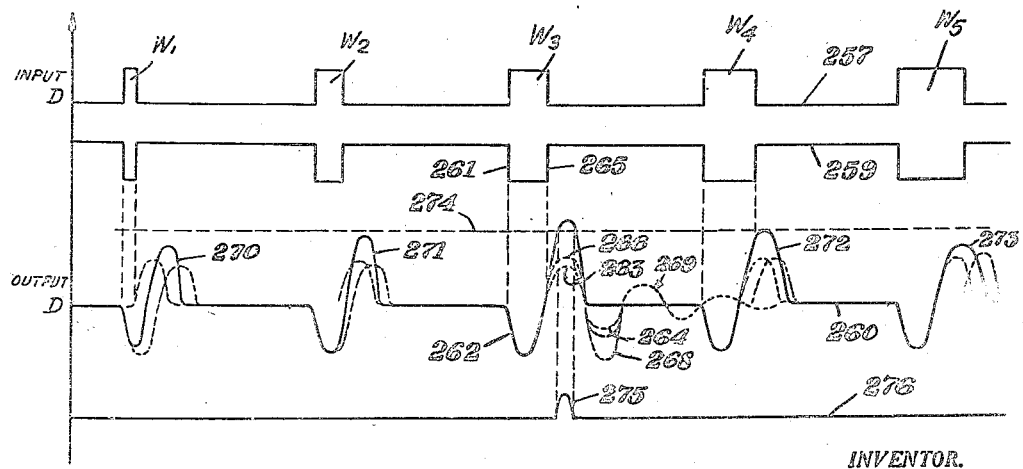
Fig. 18 is a graph of wave forms useful in explaining the operation of the circuit shown in Fig. 9 according to the modification shown in Fig. 16.

The width selector circuit of type "D" is also shown in Fig. 9, but the graph in Fig. 18 illustrates how this circuit may be employed for selecting a pulse only of a given width. In Fig. 18 there is shown a wave 257 having different width pulses $W_1$, $W_2$, $W_3$, $W_4$ and $W_5$, thereon which may occur on the wave 243 as shown in Fig. 17. This wave is introduced into the circuit at 106 and is withdrawn from the plate 256 of tube 107 as wave 259 at point 258. Assume that the circuit 109 is tuned for selection of pulse width $W_3$ the curve 260 represents the output of circuit 109 when the circuit is tuned for selection of pulse width $W_3$ illustrating the different output undulations for the different pulse widths of curve 259. When the leading edge 261 of the pulse $W_3$ is applied at negative polarity circuit 109, an initial undulation 262 is produced which is normally followed by undulations 263, 264 and so on in the form of a damped wave. When the circuit is tuned to a frequency the period of which is exactly twice the width $W_3$ the trailing edge 265 occurs where the initiated oscillatory energy crosses the zero axis from undulation 262 to undulation 263. Since the trailing edge 265 shock excites the circuit in the same direction at this point, the undulation 266 produced thereby in the circuit 109 adds algebraically to the undulation 263 to produce undulation 267. The next succeeding pairs of undulations produced by the leading and trailing edges of pulse width $W_3$ would normally tend to produce a negative undulation 268 which would continue as a damped wave as indicated at 269. The damping tube 116 however eliminates the trailing oscillations so that they do not interfere with the undulations produced by subsequent pulses applied to the circuit 109.

A pulse width less than pulse width $W_3$, such for example, as pulse widths $W_1$ and $W_2$ will not produce maximum undulations as great as the undulation 267 for the tuning adjustment corresponding to pulse width $W_3$. This is illustrated by the undulations 270 and 271 produced in response to the pulse widths $W_1$ and $W_2$, respectively. The reason for this is readily apparent because the shock excitations produced by the leading and trailing edges of the pulses of lesser width than $W_3$ are in part opposed to each other as indicated by the broken lines associated with the undulations 270 and 271. The undulations 272 and 273 produced in response to the greater pulse widths $W_4$ and $W_5$ are likewise smaller than the undulation 267 since here again the oscillations produced in response to the leading and trailing edges of the greater pulse widths are in part opposed to each other so that the alegbraic summation thereof is less than in the case of the undulations produced in response to pulse width $W_3$.

The threshold clipping stage 117 is adjusted to clip at a level 274 thereby obtaining and amplifying the crest portion 275 of the undulation 267 as indicated by wave 276. This wave 276 then controls the operation of the light or indicating means 255. If desired, the width selector of the type "D" employed in the system of Fig. 16 may be provided with a peak follower clipper to select only the greatest amplitude undulations such as 267 on wave 260 instead of clipper 117. Such a peak follower clipper automatically controls the level 274 shown in Fig. 18. Similarly pulses of other widths corresponding to other block decoupler circuits are selected in other differently tuned width selectors 254 corresponding to sections or blocks along the track 4.

(3) THE TRAIN CIRCUIT

Figure 19:
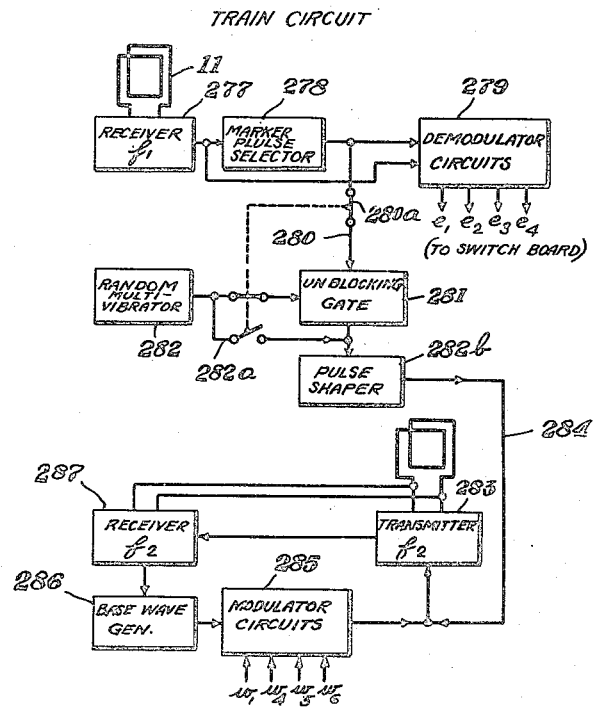
Fig. 19 is a block wiring diagram of a receiver and transmitter circuit for a vehicle such as the train with the modification shown in Fig. 16.

The train circuit in this block indicating system shown in Fig. 19, may comprise a receiver 277 coupled to the train antenna 11 for receiving the pulse wave 246 from which the marker pulses $e_M$ are selected in pulse selector circuit 278. The resulting marker pulse selected wave may then be used in deblocking the received signal channels on the wave 246 in the demodulator circuit 279.

The location indicating pulse 234 shown in Fig. 15 may be generated in two ways, one is from a marker or radar type pulse $w_M$ or $w_R$, and the other is from an independent pulse source. In the first way, the marker pulse wave may be coupled through line 280 to an unblocking gate circuit 281 which may be triggered by any random type of a multivibrator 282 which will cause a sufficient number of the marker pulses to pass the gate 281 each second to control the indicating devices 255 shown in Fig. 16. The other way is to open the switch 280a in line 280 and produce the location indicating pulses directly from the multivibrator 282 and withdraw them through line 282a. The thus produced location indicating pulses may then be passed through a suitable shaper or trigger circuit 282 for producing the pulses 234 shown in Fig. 15 which are transmitted to the $f_2$ transmitter 283 over line 284.

The train transmitter circuits may comprise suitable modulator circuits 285 which are controlled by the marker pulses on wave 243 received in receiver 287, as previously described in the circuit of Fig. 11.

(4) THE EAST TERMINAL CIRCUIT

Figure 20:
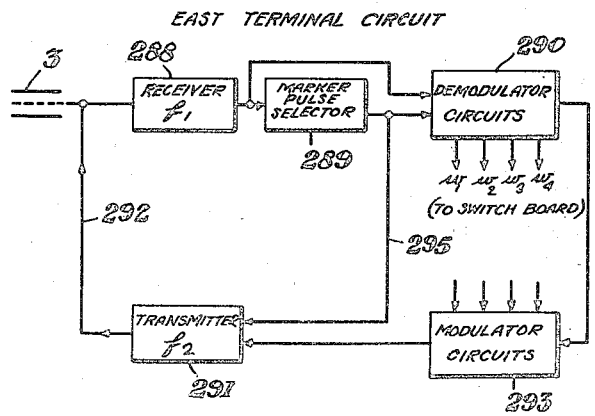
Fig. 20 is a block wiring diagram of an east terminal circuit for the modification shown in Fig. 16.

The east terminal circuit for the block indicating system is shown in Fig. 20 and may comprise only a simple $f_1$ receiver 288, marker pulse selector 289, each of which is coupled to a suitable demodulator circuit 290 for demodulating the signal channels received over wave 246. The marker pulses selected in circuit 289 may be again transmitted with the modulated signal channels $e_1$, $e_2$, $e_3$, in the $f_2$ transmitter 291 through line 292 back to cable 3. The modulator circuits 293 for channels $e_1$, $e_2$, $e_3$, may be synchronized with the demodulator channel circuits of 290 through line 294.

If desired cam flicker circuits, such as 152 shown in Fig. 11, may be inserted in lines 284 and/or 294 shown in Fig. 19 to indicate which train is in a given block.

The above described modification of a communication and block location indicating system is similar to that disclosed in Chapter IA wherein the location width pulses are inserted at random on the pulse wave 243, as shown in Fig. 17. If desired, the system described in Chapter IB may be employed in this block indicating system so that the different width location pulses $W_1$, $W_2$, etc., will occur in a given channel reserved therefor on each of the waves 243. Also, the width location pulses $W_1$, $W_2$, $W_3$, etc., may be transmitted over the outgoing wave 246 to the trains, so that location indicating devices, (similar to 252 shown in Fig. 16), could be provided in each train as well as that at the east terminal.

Vice versa, this block indicating system may distinguish the trains by different widths of the pulses, and identify the different sections or blocks along the track by a flickering device.

If it is desired that one train along the track 4 wishes to talk to another train along the same track, the modulated pulses received at the switching terminal from the one train may be directly switched to the corresponding terminal for transmission to the other train over the other frequency wave without being demodulated and remodulated in the modulation circuits at that terminal, after the destination of the message has been determined at that terminal. This may be then accomplished by a suitable switching means operated by the switchboard operator at the terminal.

If desired separate frequency waves may be employed for the radar and location pulses so that they will not interfere with the multi-channel signal pulse waves on the circuit. However, the addition of such other carrier waves would double the number of transmitters and receivers required on the train, at each terminal, and along the cable 3. Further, if desired, separate coaxial cables may be provided for each different radio frequency carrier.

The above described system has many advantages over previously employed communication systems for vehicles in that it does not require a plurality of large and strong radio stations to transmit the radio waves over long lengths of track, as well as an assigned frequency band on which they must operate. Also the short path radio coupling between the radiating means and the antenna on the vehicles is not affected by bridges and tunnels over and through which the vehicles may pass. If one of the decouplers along the coaxial cable 3 becomes disabled it does not stop the whole communication system, but only prevents reception and transmission of signals along that portion of the track corresponding to the disabled decoupler circuit.

While the above is a description of the principles of this invention in connection with specific apparatus and particular modifications thereof, it is to be clearly understood that this description is made only by way of example and not as a limitation.

I claim:

1. A system for indicating the location of vehicles along a route comprising: a transmitter-receiver terminal, a line for carrying signals of a radiation frequency, a plurality of decouplers at spaced intervals along said line, each decoupler having a radiating line, in addition to said first-mentioned line, extending along said route between it and the radiating line of the next adjacent decoupler, a signal translator means on said vehicle having an antenna radiation coupled with the nearest radiating means along said line, and means for transmitting location identifying pulses at multiple megacycle frequencies for indicating the position of said vehicle along said route.

2. A communication system for a vehicle following a route comprising: a single coaxial cable extending along said route for carrying two carrier frequency waves of video and higher frequencies, one frequency being for signals in one direction and the other frequency being for signals in the other direction along said cable, a plurality of transmitter-receivers coupled to said cable at spaced intervals along said route, each transmitter-receiver having a pair of radiating lines, in addition to said first-mentioned line, extending along said route between it and the radiating lines of the next adjacent transmitter, one radiating means for each of said frequencies, and a transmitter-receiver on said vehicle having a pair of antennas radiation-coupled with the nearest pair of radiating means along said cable.

3. A signal communication system for a vehicle following a route comprising: a pair of coaxial cables, one carrying signals modulated at one frequency for communication in one direction, and the other carrying signals modulated at another frequency for communication in the other direction along said route, a plurality of decouplers coupled to each of said cables at spaced intervals along said route, each decoupler having radiating means extending along said route between it and the radiating means of the nearest adjacent decoupler coupled to the same cable, signal translator means on said vehicle, and means for coupling said signal translator means with said cables.

4. A communication system for a vehicle following a fixed route comprising: a transmitter-receiver at one end of said route for transmitting signals on a carrier wave of one frequency and a radio transmitter-receiver at a terminal at the other end of said route for transmitting signals on a carrier wave of another frequency, said frequencies being the least of video frequency, a single coaxial cable extending along said route between said terminals for carrying both of said carrier waves, a plurality of decouplers at spaced intervals along said route, each decoupler having a pair of radiating lines, in addition to said first-mentioned line, extending along said route between it and the next adjacent decoupler, one of said radiating lines for each of said carrier waves, and a signal translator means on said vehicle having a pair of antennas radiation coupled with the nearest pair of radiating means along said cable.

5. The system of claim 4 wherein said decouplers comprise: means for separating the two carrier frequencies into said pair of radiating lines.

6. The system of claim 4 wherein said decouplers comprise: a pair of filters for separating the carrier frequency from one terminal from that of the other, and means for connecting the separated carrier frequencies to separate the ones of said pair of radiating lines.

7. A communication system for a vehicle following a route comprising: a transmitter-receiver at one end of said route for transmitting signals on one carrier wave at one frequency, another transmitter-receiver at the other end of said route for transmitting signals on another carrier wave at a different frequency, said carrier frequencies being of at least a radiation frequency, a cable extending along said route between said transmitter-receivers for carrying said carrier waves, a plurality of transmitter-receivers coupled to said cable at spaced intervals along said route, each transmitter-receiver coupled to said cable having a pair of radiating means along said route extending between it and the radiating means of the next adjacent radio transmitter, one of said radiating means being for each of said carrier waves, and a transmitter on said vehicle having a pair of antennas radiation coupled with the next pair of radiating means along said cable.

8. The system of claim 7 wherein said receivers coupled to said cable comprise: means for separating said carrier waves and means for transmitting one of said separated waves.

9. The system of claim 7 wherein said transmitter-receivers coupled to said cable include means for separating said carrier waves and means for receiving and transmitting one of said carrier waves to and from one of said radiating means.

10. The system of claim 7 wherein said transmitter-receivers coupled to said cable include means for separating said carrier waves, means for transmitting one of said separated waves to one of said pair of radiating means, and means for transmitting and receiving the other of said separated waves to and from the other of said pair of radiating means.

11. The system of claim 7 wherein said receiver-transmitters coupled to said cable at spaced intervals along said route include means for identifying which of said transmitter-receivers is adjacent said vehicle along said route.

12. The system of claim 7 wherein said transmitter-receivers coupled to said cable include means for separating said carrier waves and amplifying the separated frequencies.

13. The system of claim 7 wherein said transmitter-receivers coupled to said cable include means for separating and repeating said waves carrying modulated signals along said cable.

14. The system of claim 7 wherein said separate cables are provided for each of said carrier waves along said route.

15. The system of claim 7 wherein at least one of the transmitters includes means for transmitting signals received from one carrier wave to said other carrier wave.

16. A location indication system for vehicles along a route comprising: a transmitter-receiver terminal at one end of said route including means for transmitting pulses of a given frequency on a carrier wave, said frequency being of a radiation frequency, a cable for carrying said pulses along said route, a plurality of decouplers at spaced intervals along said cable, each of said decouplers having a radiating means along said route extending between it and the radiating means of the next adjacent decoupler, a signal translator means on said vehicle having an antenna radiation-coupled with the nearest radiating means along said cable, and said vehicle including means for receiving said pulses and retransmitting them on a carrier wave of a different frequency back over said cable to said terminal, and means in said terminal for receiving said retransmitted pulses and indicating the location of said vehicle along said route with respect to said terminal.

17. The system of claim 16 wherein each of said decouplers along said cable include means for identifying which one first receives said retransmitted pulse from said vehicle.

18. The system of claim 16 wherein said signal translator means on said vehicle includes means for identifying that vehicle from other vehicles along said route.

19. The system of claim 16 wherein said signal translator means on said vehicle includes means for controlling the retransmission of said received pulses for identifying that vehicle with respect to other vehicles along said route.

20. The system of claim 16 wherein said indicating means in said terminal includes a cathode ray tube.

21. The system of claim 16 wherein said indicating means in said terminal includes a cathode ray tube having a sweep circuit synchronized by the frequency of transmission of said pulses from said terminal, and a fluorescent screen having a scale calibrated to correspond with the length of said route, said tube being controlled to produce spots on said screen along said scale corresponding to each of said vehicles along said route.

22. The system of claim 16 wherein said indicating means in said terminal includes a cathode ray tube having a fluorescent screen with a scale corresponding to the length of said route, said tube being controlled by the retransmitted pulses from said vehicle to produce bright spots along said scale corresponding to the location of said vehicle, and means for causing said spots to flicker in a code signal corresponding to each of said vehicles along said route.

23. The system of claim 16 wherein said terminal includes means for retransmitting said received pulses for operating indicating means located at other points along said routes.

24. The system of claim 16 wherein said terminal includes means for retransmitting said received pulses for operating indicating means in each of the vehicles along said route for indicating the location of each of said vehicles along said route as well as the location of said terminal.

25. The system of claim 16 wherein said indicating means includes a cathode ray device for visually indicating the speed and direction of each of said vehicles along said route.

26. The system of claim 16 wherein said indicating means includes means for indicating the relative speed of said vehicles with respect to said terminal.

27. A multichannel signal communication system for a vehicle following a route comprising: a terminal radio transmitter receiver for transmitting a plurality of trains of interleaved signal modulated pulses and a train of marker pulses separating like groups of signal modulated pulses and transmitting the resulting combined multichannel pulse wave having at least a radiation frequency, a cable for carrying said multichannel pulse wave along said route, a plurality of decouplers at spaced intervals along said cable, each decoupler having a radiating means extending along said route between it and the radiating means of the next adjacent decoupler, and a signal translator means on said vehicle having an antenna coupled with the nearest radiating means along said cable for receiving said marker pulses and at least one channel of said signal modulated pulses.

28. A multichannel signal communication and location indicating system for vehicles following a route comprising: a transmitter-receiver at one end of said route for transmitting a plurality of signal modulated pulses on a carrier wave having at least a radiation frequency, another transmitter-receiver at the other end of said route for transmitting a plurality of signal modulated pulses on a carrier wave having at least a radiation frequency and different from said first mentioned frequency, said carrier frequency waves also carrying marker pulses interleaved between similar channel groups of signal modulated pulses and one of said carrier waves carrying location-indicating pulses having a frequency lower than that of said marker pulses, a cable extending between said end transmitter-receivers and along said route for carrying said carrier waves, a plurality of decouplers at spaced intervals along said cable, each decoupler having a pair of radiating means extending along said route between it and the radiating means of the next adjacent decoupler, one radiating means of each pair for each of said carrier waves, and a transmitter receiver on said vehicle having a pair of antennas radiation-coupled with the nearest pair of radiating means along said cable.

29. The system of claim 28, wherein said location indicating pulses are in synchronism with said marker pulses and differ therefrom in width.

30. The system of claim 28 wherein the frequency of the marker pulses along each carrier wave is the same.

31. The system of claim 28 wherein the frequency of the marker pulses along the carrier wave is different.

32. The system of claim 28 wherein at least one of the transmitters in said system includes means controlled by said location indication pulses for indicating the location of said vehicle along said route.

33. The system of claim 28 wherein the transmitter-receiver transmitting the location-indicating pulse includes means for indicating the position of the vehicles along said route.

34. The system of claim 28 wherein all said transmitter-receivers includes means for indicating the location of each vehicle along said route in response to the retransmission by each of said vehicles of said location-indicating pulse.

35. The system of claim 28 wherein the transmitter-receiver on said vehicle receives the marker pulses from both carrier waves.

36. The system of claim 28 wherein said transmitter-receivers are provided with means for alternately blocking each other for a given period of time for transmission of received location indicating pulses on their transmitted waves.

37. The system of claim 28 wherein said transmitter-receivers include means for demodulating the signal modulated pulses and means for eliminating any hum due to the location-indicating pulses on the resulting demodulated signal waves.

38. The system of claim 28 wherein said transmitter-receivers on said vehicles reshape the received location-indicating pulses, retransmit the resulting reshaped pulses, and wherein said terminal receiver has means for separating the reshaped pulses from the other and signal modulated pulses on said carrier waves.

39. The system of claim 28 wherein said transmitter-receiver on said vehicle includes means for changing the width of the location-indicating pulses received by said vehicle, retransmits the resulting reshaped pulses, and wherein said receivers have means for width selecting the reshaped pulses and means operated by the resulting selected pulses for indicating simultaneously the position of said vehicle along said route.

40. A multichannel signal communication and location indicating system for a vehicle following a route comprising: a terminal transmitter and receiver for transmitting and receiving a plurality of signal modulated pulses representing a plurality of different signal channels including location-indicating pulses, a cable for carrying said pulses along said route at a frequency of at least video frequency, a plurality of decouplers at spaced intervals along said cable, each having a radiating means extending along said route between it and the radiating means of the next adjacent decoupler, and a signal translator means on said vehicle having an antenna radiation-coupled with the nearest radiating means along said cable including means for separating the different signal channel on the received pulse wave, means for separating the location indication pulses on said wave, and means controlled by the resulting separated location indicating pulses for indicating the relative location of said vehicle along said route.

41. The system of claim 40 wherein at least one of the pulse signal channels is an audio signal channel.

42. The system of claim 40, wherein at least one of the pulse signal channels is a telegraphic signal channel.

43. The system of claim 40 wherein at least two of said signal channels have a sufficiently wide frequency band for audio frequency signals and at least one of said audio frequency channels is divided into a plurality of telegraphic signal channels.

44. A location indicating system for vehicles following a fixed route comprising: a terminal transmitter-receiver, for transmitting a location indicating pulse, a cable for carrying said pulse along said route, a plurality of decouplers at spaced intervals along said cable, each decoupler having a radiating means extending along said route between it and the radiating means of the next adjacent decoupler, a signal translator means on said vehicle having an antenna radiation-coupled with the nearest radiating means along said cable, including means for receiving and retransmitting said pulse back over said cable to said terminal, and means at said terminal for receiving said retransmitted pulse, including means for indicating the time elapsed between the transmission of said pulse from said terminal and the reception of said pulse at said terminal whereby the distance between said terminal and said vehicle may be determined.

45. The system of claim 44, wherein said vehicle signal translator means includes means for reshaping said pulse before it is retransmitted thereby.

46. A system according to claim 44, wherein said vehicle signal translator means includes means for applying a signal to said pulse whereby said vehicle may be identified at said terminal.

47. The system of claim 44, wherein said means for determining the time delay between the transmission of said pulse and the reception of its echo includes a cathode ray device.

HENRI G. BUSIGNIES.

REFERENCES CITED

The following references are of record in the file of this patent:

UNITED STATES PATENTS

| Number | Name | Date |
|---|---|---|
| 1,453,387 | Espenschied et al. | May 1, 1923 |
| 1,552,919 | Gauthier | Sept. 8, 1925 |
| 1,780,921 | Horton | Nov. 11, 1930 |
| 1,803,453 | Affel | May 5, 1931 |
| 1,894,019 | Buckley | Jan. 10, 1933 |
| 1,947,018 | Plastino | Feb. 13, 1934 |
| 2,171,293 | Plastino | Aug. 29, 1939 |
| 2,380,864 | Nicholson | July 31, 1945 |
| 2,391,991 | Mackey et al. | Jan. 1, 1946 |
| 2,393,291 | Clark, Jr. | Jan. 22, 1946 |
| 2,407,417 | Halstead | Sept. 10, 1946 |

FOREIGN PATENTS

| Number | Country | Date |
|---|---|---|
| 116,666 | Australia | Oct. 10, 1941 |